United States Patent
Thomas et al.

(10) Patent No.: US 11,456,871 B2
(45) Date of Patent: Sep. 27, 2022

(54) SYSTEM AND METHOD FOR AUTONOMOUS MAPPING OF ENTERPRISE IDENTITY

(71) Applicant: Provide Technologies Inc., Peachtree Corners, GA (US)

(72) Inventors: Kyle Barrett Thomas, Peachtree Corners, GA (US); Eoin Connolly, Navan (IE); Stefan Schmidt, Bingen am Rhein (DE)

(73) Assignee: Provide Technologies, Inc., Peachtree Corners, GA (US)

( * ) Notice: Subject to any disclaimer, the term of this patent is extended or adjusted under 35 U.S.C. 154(b) by 0 days.

(21) Appl. No.: 17/088,472

(22) Filed: Nov. 3, 2020

(65) Prior Publication Data

US 2022/0141019 A1 May 5, 2022

(51) Int. Cl.
*H04L 9/32* (2006.01)
*G06Q 10/10* (2012.01)
(Continued)

(52) U.S. Cl.
CPC ......... *H04L 9/3213* (2013.01); *G06Q 10/105* (2013.01); *G06Q 30/0185* (2013.01); *H04L 9/085* (2013.01); *H04L 9/0861* (2013.01); *H04L 9/30* (2013.01); *G06Q 10/0631* (2013.01); *G06Q 30/01* (2013.01); *G06Q 50/28* (2013.01); *G06Q 2220/00* (2013.01)

(58) Field of Classification Search
CPC ..... H04L 9/3213; H04L 9/085; H04L 9/0861; H04L 9/30; G06Q 10/105; G06Q 30/0185
See application file for complete search history.

(56) References Cited

U.S. PATENT DOCUMENTS 9,635,000 B1 4/2017 Muftic
10,102,526 B1 * 10/2018 Madisetti ............. G06Q 20/389
(Continued)

OTHER PUBLICATIONS

Alphand et al. (IoTChain: A Blockchain Security Architecture for the Internet of Things, IEEE Wireless Communications and Networking Conference, Apr. 2018, 7 pages) (Year: 2018).*
(Continued)

*Primary Examiner* — Oleg Korsak
(74) *Attorney, Agent, or Firm* — Bekiares Eliezer LLP

(57) ABSTRACT

The present disclosure may provide methods, systems, and computer-readable instructions for enabling the following operations: generating a secret key based on, at least in part, a target party's public key; encrypting a payload with the secret key, the payload comprising an auth token with a limited time to live (TTL); broadcasting, to a public blockchain, a message comprising the encrypted payload; receiving a request to establish a channel of communication outside of the public blockchain; receiving, with the request, the auth token within the TTL; validating the auth token within the TTL; establishing the channel of communication upon a validation of the auth token; engaging in a data-exchange over the channel of communication; verifying matching properties of the exchanged data with at least one internal system of record; and mapping an internal identifier within the at least one system of record to a decentralized identifier associated with the target party.

20 Claims, 4 Drawing Sheets

(51) Int. Cl.

| | | |
|---|---|---|
| *G06Q 30/00* | (2012.01) | |
| *H04L 9/08* | (2006.01) | |
| *H04L 9/30* | (2006.01) | |
| *G06Q 50/28* | (2012.01) | |
| *G06Q 10/06* | (2012.01) | |

(56) References Cited

U.S. PATENT DOCUMENTS

| | | | |
|---|---|---|---|
| 10,601,829 B1* | 3/2020 | Nelson | H04L 9/3239 |
| 2018/0343238 A1* | 11/2018 | Tola | H04L 9/14 |
| 2019/0171848 A1* | 6/2019 | Kalita | G06F 16/245 |
| 2020/0036707 A1* | 1/2020 | Callahan | H04L 9/3231 |
| 2020/0143337 A1* | 5/2020 | Conroy | G06Q 20/3829 |
| 2020/0162239 A1* | 5/2020 | Carver | G06F 16/2365 |
| 2020/0258152 A1* | 8/2020 | Naggar | G06Q 20/108 |
| 2020/0266985 A1* | 8/2020 | Covaci | H04L 9/3066 |

OTHER PUBLICATIONS

Kfoury et al. (Secure End-to-End VoIP System Based on Ethereum Blockchain, JoC, Aug. 2018, 6 pages) (Year: 2018).*
International Search Report and Written Opinion dated Nov. 26, 2021 cited in Application No. PCT/JS2021/057876, 9 pgs.
O. Alphand et al., "IoTChain: A Blockchain Security Architecture for the Internet of Things," IEEE Wireless Communications and Networking Conference, Apr. 2018, 7 pgs.

* cited by examiner

SYSTEM AND METHOD FOR AUTONOMOUS MAPPING OF ENTERPRISE IDENTITY

FIELD OF DISCLOSURE

The present disclosure generally relates to autonomous identify (ID) verification using blockchain for trustless Electronic Data interchange (EDI) between parties.

BACKGROUND

Electronic Data Interchange (EDI) is the process of sharing documents between entities in standardized formats that enable the shared documents and corresponding data to be automatically entered into the receiving entity's system of record. EDI processes minimize errors that may be generated by humans, thereby making both companies more efficient and, in turn, decreasing expenses. In conventional solutions, each entity may employ an EDI translator software, communication software, and hardware for data transfer (VAN, dedicated line, or EDI via the internet). Furthermore, the entities may be under a contractual arrangement as to how to resolve issues that may arise during the process.

EDI process implementation may provide a plurality of advantages. For instance, an entity may have improved data accuracy due to the fact there will be reduced clerical errors. As such, the human error factor is bypassed by the direct transfer of data between the entities. Furthermore, customer service, inventory management, and overall communications may all be improved.

Nevertheless, the benefits of using EDI are accompanied by certain challenges relating to auditing and integration with enterprise systems of record. As one example, conventional systems have not replaced the human element necessary to ensure certain transactions represented within the EDI process actually took place, as with EDI there are no longer human signatures to verify the transactions took place. Accordingly, conventional systems do not address the need to verify the identity, authenticity authorization and consistency of the data. Electronic data interchange (EDI) has long failed to provide an autonomous method of mapping organizations for business processes automation.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

The present disclosure may provide methods, systems, and computer-readable instructions for enabling the following operations: generating a secret key based on, at least in part, a target party's public key; encrypting a payload with the secret key, the payload comprising an auth token with a limited time to live (TTL); broadcasting, to a public blockchain, a message comprising the encrypted payload; receiving a request to establish a channel of communication outside of the public blockchain; receiving, with the request, the auth token within the TTL; validating the auth token within the TTL; establishing the channel of communication upon a validation of the auth token; engaging in a data-exchange over the channel of communication; verifying matching properties of the exchanged data with at least one internal system of record; and mapping an internal identifier within the at least one system of record to a decentralized identifier associated with the target party.

The present disclosure may provide methods, systems, and computer-readable instructions for enabling the following operations: listening for a broadcast of the message comprising the encrypted payload; retrieving the message containing the encrypted payload; extracting the payload using, at least in part, the secret key; determining an endpoint address for establishing the channel of communication with the auth token within the TTL; requesting the channel of communication at the endpoint address; presenting the auth token for establishing the channel of communication at the endpoint address within the TTL.

The present disclosure may provide methods, systems, and computer-readable instructions for enabling the following operations: maintaining a decentralized registry on the public blockchain; and posting one or more smart contracts to the public blockchain, wherein the one or more smart contracts are provided to: publish the requesting party's public key associated with the requesting party; publish the target party's public key associated with the target party; publish a first endpoint address associated with the requesting party; and publish a second endpoint address associated with the target party.

The present disclosure may provide methods, systems, and computer-readable instructions for enabling the following operations: retrieving a target public key associated with the target party; generating a secret based on, at least in part, the target public key associated with the target party and a private key associated with a requesting party; generating a payload configured to be used for establishing a direct channel of communication between the requesting party and the target party for validating each party's identify, wherein the payload comprises an auth token with a limited time to live (TTL); encrypting the payload using the secret; and broadcasting a message comprising the payload to a public blockchain.

The present disclosure may provide methods, systems, and computer-readable instructions for enabling the following operations: scanning the public blockchain for any message that can be decrypted using, at least in part, the requesting party's public key; identifying a message that can be decrypted using, at least in part, the requesting party's public key and a private key associated with the target party; decrypting the message to obtain the payload, wherein decrypting comprises: extracting the payload to obtain the auth token with the limited TTL period; and requesting to establish the direct channel of communication at an endpoint associated with the requesting party, wherein a request comprises receiving the auth token within the TTL period.

The present disclosure may provide methods, systems, and computer-readable instructions for enabling the following operations: receiving, from the target party, a request to establish the direct channel of communication at an endpoint address associated with the requesting party, wherein receiving the request comprises receiving the auth token with the request; and accepting a connection if, at least in part, the request comprises the auth token with the TTL period.

The present disclosure may provide methods, systems, and computer-readable instructions for enabling the following operations: exchanging, via the direct channel of communication between the requesting party and the target party, data used to validate the identify of at least one party, validating an identity of the at least one party based on the data; and mapping, upon validation, a private identifier of the first party with a public identifier of the target party.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
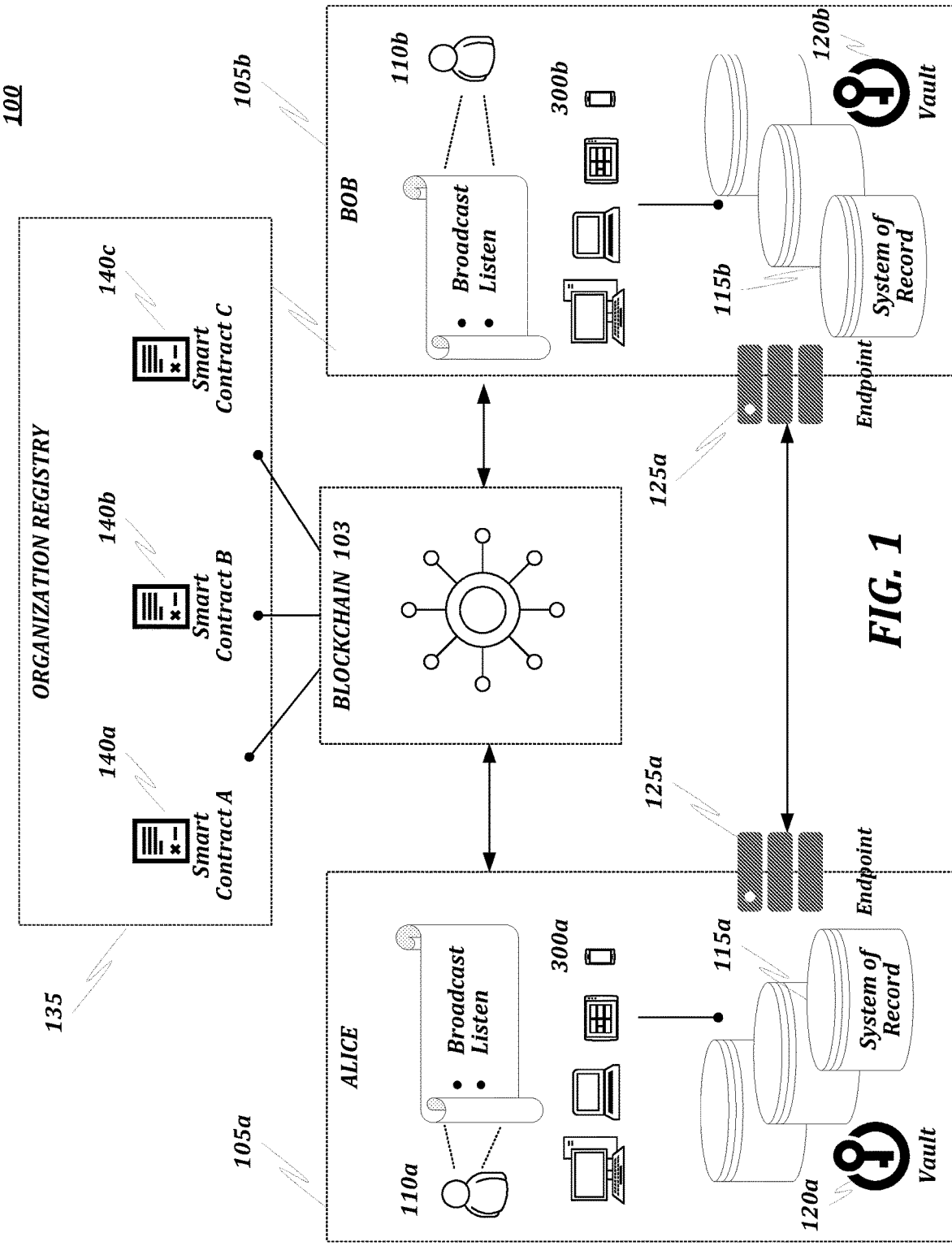
FIG. 1 illustrates a block diagram of an operating environment consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subject matter disclosed under the header.

The present disclosure includes many aspects and features relating to a system and method for automating the mapping of internal and external identifiers representing corporate entities or individuals. Moreover, while many aspects and features relate to, and are described in, the context of supply chain and business process automation, embodiments of the present disclosure are not limited to use only in this context.

I. PLATFORM OVERVIEW

This overview is provided to introduce a selection of concepts in a simplified form that are further described below. This overview is not intended to identify key features or essential features of the claimed subject matter. Nor is this overview intended to be used to limit the claimed subject matter's scope.

Embodiments of the present disclosure may provide an autonomous system for mapping internal identifiers within systems of record to externally verifiable corporate identities using an internet-based environment and a public blockchain. The methods and systems may be applicable in, although not limited to, supply chain and business process automation. In scenarios applicable to the various embodiments herein, an organization may need to map an internal representation of an identity of a third-party (hereinafter referred to as an "internal identifier"). The internal identifier may be used by the organization in its internal systems such as, for example, but not limited to, its enterprise resource planning (ERP) systems, customer-relationship management (CRM) systems, electronic records management (ERM) systems, and the like (collectively referred to as a "systems of record").

For instance, the organization may need to map the internal identifier it has attributed to a vendor within its ERP system such as SAP or Microsoft Dynamics to an external identifier attributed to the vendor. The mapping process may be important in establishing, for example, the verification of each party's identity in order to securely facilitate the bi-directional transaction of data between the parties. As will be detailed below, such bi-directional data transactions may be initiated by the underlying systems of record for each organization.

Embodiments of the present disclosure may provide a decentralized identifier (DID) for each party. The decentralized identifier may be stored in a tamper-resistant public registry (e.g., the third-party organization's secp256k1-based public address or other decentralized identifier). In this way, when an organization needs to map its internal identifier for a third-party, embodiments of the present disclosure may employ its counterpart DID stored in a tamper-resistant public registry.

Embodiments of the present disclosure may provide methods, systems, and computer-readable instructions communicated over computer-readable media (collectively referred to as the "platform") for the autonomous verification of a DID associated with a third-party with an internal identifier used within an organization, or by its systems of record, to represent the third-party. The platform may employ an algorithm to enable private communications over a public channel to facilitate the ID verification. For example, in some embodiments, the platform may employ Diffie-Hellman key exchange using Ed25519 public keys stored in a tamper-resistant public registry, a homomorphic encryption protocol, or other similar systems and protocols. The platform may then generate a suitable challenge and solicits a response by broadcasting a message to the public blockchain. Any organization capable of decrypting the challenge and responding successfully (i.e., with verifiable responses to the broadcast challenge) will have then successfully verified its identity. In turn, the mapping can be completed within the initiator's system of record.

Still consistent with embodiments of the present disclosure, an autonomous system may be provided for ID verification and automation. The system may be operative to perform a method for mapping internal identifiers within systems of record to externally verifiable identities for the same entity using an internet-based environment and a public blockchain. Accordingly, embodiments of the present disclosure may provide an autonomous method for matching a private identifier attributed to a second party, as established by an internal system of record associated with a first party, with a public identifier, as established for the second party by a decentralized platform (e.g., smart contract-based registry of data). In this way, a matched private identifier with a matched public identifier is used to establish a secure and trustless channel of data communication between the off-chain internal system of record for the first party with an off-chain internal system of record for the second party, by way of validation through the on-chain decentralized platform.

Still consistent with embodiments of the present disclosure, in some embodiments, the Ekho protocol may be used to by the first party write a message to the blockchain having an 8-byte identifier (derived from secret and public signing key of the sending party). The second party (having the secret and public key of the sending party) can read the 8-byte identifier and know the message is for them from the sending party. In turn, the generated secret is used (in a signal protocol double-ratchet manner) to decrypt the limited-ttl token (e.g., the payload in the blockchain broadcast).

Embodiments of the present disclosure may comprise methods, systems, and a computer readable medium comprising, but not limited to, at least one of the following:
  A. A Broadcasting User Layer;
  B. A Listening User Layer; and
  C. A Blockchain Layer.

In some embodiments, the present disclosure may provide an additional set of modules for further facilitating the software and hardware platform. The additional set of modules may comprise, but not be limited to:
  D. An Endpoint Connection Module;
  E. An Internal System of Record Module; and
  F. An Organization Registry Module.

Details with regards to each layer and module is provided below. Although the layers and modules are disclosed with specific functionality, it should be understood that functionality may be shared between layers and modules, with some functions split between layers and modules, while other functions duplicated by the layers and modules. Furthermore, the name of the layer or module should not be construed as limiting upon the functionality of the layer or module. Moreover, each component disclosed within each layer or module can be considered independently without the context of the other components within the same or different layers and modules. Each component may contain language defined in other portions of this specification. Each component disclosed for one layer or module may be mixed with the functionality of another layer or module. In the present disclosure, each component can be claimed on its own and/or interchangeably with other components of other layers or modules.

The following depicts an example of a method of a plurality of methods that may be performed by at least one of the aforementioned modules, or components thereof. Various hardware components may be used at the various stages of operations disclosed with reference to each module. For example, although methods may be described to be performed by a single computing device, it should be understood that, in some embodiments, different operations may be performed by different networked elements in operative communication with the computing device. For example, at least one computing device 300 may be employed in the performance of some or all of the stages disclosed with regard to the methods. Similarly, an apparatus may be employed in the performance of some or all of the stages of the methods. As such, the apparatus may comprise at least those architectural components as found in computing device 300.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed without altering or deterring from the fundamental scope of the depicted methods and systems disclosed herein.

Consistent with embodiments of the present disclosure, a first method may be performed by at least one of the modules disclosed herein. The first method may be embodied as, for example, but not limited to, computer instructions, which when executed, perform the method. The first method may comprise the following stages:

1. Performing a lookup of a second party's public key in a decentralized registry stored on a blockchain; 2. Retrieving the second party's public key from the decentralized registry; 3. Generating a secret key based on the second party's public key; and 4. Communicating a message comprising a methodology to derive the secret key. In some embodiments, the communication stage may not be required.

Consistent with embodiments of the present disclosure, a second method may be performed by at least one of the modules disclosed herein. The second method may be embodied as, for example, but not limited to, computer instructions, which when executed, perform the method. The second method may comprise the following stages:

1. Listening (or otherwise analyzing) for a message containing a methodology for deriving the secret key; 2. Retrieving the message containing the methodology for deriving the secret key; 3. Communicating a confirmation message. In some embodiments, the communication of the confirmation message may not be required.

Consistent with embodiments of the present disclosure, a third method may be performed by at least one of the modules disclosed herein. The third method may be embodied as, for example, but not limited to, computer instructions, which when executed, perform the method. The third method may comprise the following stages:

1. Listening (or otherwise analyzing) for a message containing a confirmation of receipt of the methodology for deriving the secret key; 2. Receiving the message containing the confirmation; 3. Initiating a process to broadcast a payload encrypted using the secret key.

In some embodiments, in which the confirmation message is not communicated, the initiation of the payload encryption and broadcast may occur after having generated the secret key, without the second method and the third method serving as intermediary stages. Accordingly, here, the stages of listening and receiving a confirmation of receipt of the secret key may not be required. Furthermore, in the various embodiments comprising the second and third methods, the aforementioned message may be performed off-chain, outside of a public band.

Consistent with embodiments of the present disclosure, a fourth method may be performed by at least one of the modules disclosed herein. The fourth method may be embodied as, for example, but not limited to, computer instructions, which when executed, perform the method. The fourth method may comprise the following stages:

1. Encrypting a payload with the secret key, the payload comprising an auth token with a limited time to live (TTL); and 2. Broadcasting the encrypted payload.

Consistent with embodiments of the present disclosure, a fifth method may be performed by at least one of the modules disclosed herein. The fifth method may be embodied as, for example, but not limited to, computer instructions, which when executed, perform the method. The fifth method may comprise the following stages:

1. Listening (or otherwise analyzing) to messages posted to the blockchain for a broadcast of a message containing the payload; 2. Retrieving the message containing the payload; and 3. Extracting the payload. The payload may be decrypted using the secret key. The secret key may have been previously communicated between the parties, off-chain, in anticipation of the broadcast of the payload.

Consistent with embodiments of the present disclosure, a sixth method may be performed by at least one of the modules disclosed herein. The sixth method may be embodied as, for example, but not limited to, computer instructions, which when executed, perform the method. The sixth method may comprise the following stages:

1. Performing a lookup of an endpoint address for establishing a channel of communication with the auth token within the limited TTL; and 2. Retrieving the endpoint address for establishing a channel of communication with the auth token within the limited TTL. In various embodiments, the payload may comprise the endpoint address. Therefore, in such embodiments, additional stages associated with endpoint address lookup may not be required.

Consistent with embodiments of the present disclosure, a seventh method may be performed by at least one of the modules disclosed herein. The seventh method may be embodied as, for example, but not limited to, computer instructions, which when executed, perform the method. The seventh method may comprise the following stages:

1. Requesting a channel of communication at the endpoint address; 2. Presenting the auth token for establishing the channel of communication at the endpoint address within the TTL; 3. Validating the auth token within the TTL; and 4. Establishing the channel of communication upon the validation of the auth token within the TTL.

Consistent with embodiments of the present disclosure, an eighth method may be performed by at least one of the modules disclosed herein. The eighth method may be embodied as, for example, but not limited to, computer instructions, which when executed, perform the method. The eighth method may comprise the following stages:

1. Receiving a request to establish the channel of communication at the endpoint address; 2. Receiving the auth token for establishing the channel of communication at the endpoint address within the TTL; 3. Validating the auth token within the TTL; and 4. Establishing the channel of communication upon the validation of the auth token within the TTL.

Consistent with embodiments of the present disclosure, a ninth method may be performed by at least one of the modules disclosed herein. The ninth method may be embodied as, for example, but not limited to, computer instructions, which when executed, perform the method. The ninth method may comprise the following stages:

1. Engaging in a bi-directional data-exchange over the channel of communication; 2. Verifying matching properties of the exchanged data with internal systems of record; and 3. Mapping an internal identifier within the systems of record to a DID in the decentralized registry.

Although the aforementioned method has been described to be performed in various methods, it should be understood that the methods may be combined, with steps rearranged, removed, added, combined or otherwise modified. Furthermore, in some embodiments, different operations may be performed by different networked elements in operative communication with each other. For example, a plurality of computing devices may be employed in the performance of some or all of the stages in the aforementioned method. Moreover, a plurality of computing devices may be configured much like a single computing device described herein. Further still, some or all of the aforementioned stages or methods, may be facilitated, at least in part, by a smart contract executing on a blockchain. In various other embodiments, some or all of the aforementioned stages or methods, may be facilitated, at least in part, by a centralized computing device in operative communication with a smart contract executing on the blockchain. In yet further embodiments, some or all of the aforementioned stages or methods, may be facilitated, at least in part, by a first party computing system in operative communication with a smart contract executing on the blockchain and/or a second party computing system in operative communication with a smart contract executing on the blockchain.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and subcombinations described in the detailed description.

II. Platform Configuration

FIG. 1 illustrates one possible operating environment through which a platform consistent with embodiments of the present disclosure may be provided. By way of non-limiting example, a platform 100 for providing the methods and systems for may be hosted in both a blockchain protocol ("on-chain") and off of a blockchain protocol ("off-chain"). One possible embodiment of the platform may be provided by the Shuttle Protocol™ provided by Provide Technologies Inc. It should be understood that layers and stages performed by the layers may be either "on-chain" or "off-chain." The present disclosure anticipates embodiments with variations as to which stages may be performed "on-chain" or "off-chain." Embodiments of the present disclosure may use, at least in part, various aspects of the Baseline and Ekho protocols.

Accordingly, embodiments of the present disclosure provide a software and hardware platform comprised of a distributed set of computing elements, including, but not limited to the following layers and modules.
  A. A Blockchain Layer 130,
    i. An Organization Registry Module 135,
      1. Smart Contracts A-C, 140A-C
  B. A Broadcasting User Layer 105a,
    ii. An Internal System of Record Module 115a,
    iii. A Vault Module 120a, and
    iv. An Endpoint Module 125a;
  C. A Listening User Layer 105b,
    v. An Internal System of Record Module 115b,
    vi. A Vault Module 120b, and
    vii. An Endpoint Module 125b;
The following details the aforementioned layers and modules.

A. The Blockchain Layer 130

Embodiments of the present disclosure may provide a tamper-resistant, publicly accessible storage facility. Such facility may be recorded on to a decentralized and distributed network environment, such as a blockchain. The storage facility may be used as, for example, a registry. The registry may be governed by one or more smart contracts 140A-C on a public blockchain.

It should be understood that, in various embodiments, the blockchain layer 130 may be configured to provide additional smart contract functionality in the transaction of data between parties. For the illustrative purposes of the present disclosure, the blockchain layer 130 has deployed therein one or more smart contracts that facilitate the publication of registry data as well as the broadcast of messages. In some embodiments, there may be no requirement for a broadcast to be facilitated by the same blockchain. Embodiments herein may employ one or more blockchain protocols or one or more entries in a distributed ledger of the same blockchain protocol. A blockchain may be used to 1) establish a secure channel (i.e., using the Diffie-Hellman methodology), and 2) deliver a signed DID to, for example, the broadcasting party, so they can connect to an endpoint of the system.

i. The Organization Registry Module 135

Accordingly, an organization registry module may be provided. The module may be configured to provide and maintain a registry that may be used to, by way of non-limiting example, store certain details associated with people or entities. The registry may be employed in various methods and systems disclosed herein to enable the people or entities to verify each other's respective identifiers. For example, specific details of each participating organization may be stored within an organization registry. The details may include, but not be limited to, a decentralized identifier (DID), a TCP/IP endpoint used to establish a point-to-point connection with each organization (e.g., NATS or other enterprise messaging infrastructure), and a public key specifically used for securing interorganizational point-to-point connections.

Consistent with embodiments of the present disclosure, the registry may support self-sovereign identity based on, for example, but not be limited to, W3C Decentralized Identifiers (DIDs) and W3C Verifiable Credentials (VCs). In this way, an organization can perform various operations, in a privacy-preserving manner, including, but not limited to: verifying the identity of a counterparty, engaging in a commercial relationship, and generating digital document proofs that could be used in a judicial proceeding.

Accordingly, a platform user may create an organization messaging public/private key pair and publish their public key in the organization's registry. Further still, the user may publish an address for an endpoint for establishing a connection with the organization's computing systems 300. As will be detailed below, however, each organization may not accept connections at their endpoint without the requisite authorization token. In some embodiments, the token may be a bearer authorization token.

Furthermore, once the handshake is established though, a point-to-point connection is established between the parties, for example, using NATS. Communication may occur through the direct connection.

In yet further embodiments, an organizational registry may be dynamically constructed off-chain based on a replayable stream of messages broadcast through a public utility. In this instance, the messages may comprise certain attestations that may be attributed to certain network users, and their corresponding public domain information.

B. The Broadcasting User Layer 105a

In accordance with embodiments of the present disclosure, layer 105a may be comprised of one or more computing systems 300, a system of record module 115a, a vault module 120a, and an endpoint module 125a. Computing systems 300 are disclosed with reference to FIG. 3 below, and provide the hardware infrastructure by which layer 105a may interface with platform 100.

i. An Internal System of Record Module 115a

The system of record module 115a may be an internal system associated with user 110a. The internal system may comprise, for example, but not limited to, an enterprise resource planning (ERP) systems, customer-relationship management (CRM) systems, electronic records management (ERM) systems, and the like (collectively referred to as a "systems of record"). System of record module 115a may attribute an identifier to other, external systems, managed and operated by third parties (e.g., the system of record module 115b attributed to user 110b).

User 110a may desire to engage in data transactions with such external systems and employ the various embodiments of the present disclosure to verify the identity of the third parties that manage and operate said external systems (i.e., the system of record module 115b attributed to user 110b). Utilizing the methods and systems of platform 100, the systems of record 115a associated with user 110a may interact with the systems of record 115b associated with user 110b in a trust-less environment, knowing that the data is being transacted with the intended identified and verified entity and its corresponding systems. Having verified each other's identity, user 110a and user 110b may then engage in bi-directional communication as facilitated through, for example, but not limited to, each other's endpoints 125a and 125b or other direct or indirect channel of communication between the systems of record 115a associated with user 110a and the systems of record 115b associated with user 110b.

ii. A Vault Module 120a

To enable the advantages of the various embodiments herein, user layer 105a may be configured to generate an organization messaging key. The key may be, for example, an Ed25519 public/private key pair. The public key may be published to the blockchain layer 130 in, for example, organization registry 135. The private key, however, may be secured in vault 120a for later retrieval and processing.

Furthermore, in some embodiments, in order to facilitate the publication of a secret key that may be decrypted by a receiving party without sharing any private keys, the Ed25519 public/private key pair may be converted using a cryptographic algorithm. In one instance, the cryptographic algorithm employed may provide for a conversion of the Ed25519 in an X25519 Diffie-Hellman public/private key pair. In some embodiments, the public X25519 Diffie-Hellman key may be published, while the private X25519 Diffie-Hellman key may be secured in vault 120a for later retrieval and processing. The published public keys may in turn, in some embodiments, serve as the decentralized identifier (DID) of user 110a. The DID of user 110a may then, in turn, be employed in verifying the user's identity.

iii. An Endpoint Module 125a

A layer 105a may comprise an endpoint module 125a capable of bi-directional data communication in an enterprise systems environment. By way of non-limiting example, one such communication protocol employed by platform 100 may be, for example, the NATs protocol. The associated address (e.g., TCP/IP address of the endpoint may be published to blockchain 130, within, for example, but not limited to, organization registry 135.

Consistent with embodiments of the present disclosure, layer 105a may receive requests to establish a channel of communication with another endpoint (e.g., endpoint 125b associated with layer 105b). As will be detailed below, if such requests meet certain requirements (e.g., a signed auth token is received before its expiration), layer 105a may accept the connection and, in this way, a channel of communication may be established between layer 105a and layer 105b. In turn, the systems of record 115a associated with user 110a and the systems of record 115b associated with user 110b may bi-directionally share data.

C. The Listening User Layer 105b

In accordance with embodiments of the present disclosure, layer 105b may be comprised of one or more computing systems 300, a system of record module 115b, a vault module 120a, and an endpoint module 125b. Computing systems 300 are disclosed with reference to FIG. 3 below, and provide the hardware infrastructure by which layer 105b may interface with platform 100.

It should be understood that, although layer 105a is labeled as a "broadcast" layer, and layer 105b is labeled as a "listening" layer, both layers may share both broadcast and listening functionality. The corresponding function attributed to any particular layer may depend on what role each party plays during the verification process consistent with embodiments of the present disclosure and/or the stage within the verification process.

i. An Internal System of Record Module 115b

The system of record module 115b may be an internal system associated with user 110b. The internal system may comprise, for example, but not limited to, enterprise resource planning (ERP) systems, customer-relationship management (CRM) systems, electronic records management (ERM) systems, and the like (collectively referred to as a "systems of record"). System of record module 115b may attribute an identifier to other, external systems, managed and operated by third parties (e.g., the system of record module 115a attributed to user 110a).

User 110b may desire to engage in data transaction with such external systems and employ the various embodiments of the present disclosure to verify the identity of the third parties that manage and operate said external systems (i.e., the system of record module 115a attributed to user 110a). Utilizing the methods and systems of platform 100, the systems of record 115a associated with user 110a may interact with the systems of record 115b associated with user 110b in a trust-less environment, knowing that the data is being transacted with the intended identified and verified entity and its corresponding systems. Having verified each other's identity, user 110a and user 110b may then engage in bi-directional communication as facilitated through, for example, but not limited to, each other's endpoints 125a and 125b or other direct or indirect channel of communication between the systems of record 115a associated with user 110a and the systems of record 115b associated with user 110b.

ii. A Vault Module 120b

To enable the advantages of the various embodiments herein, user layer 105b may be configured to generate an organization messaging key. The key may be, for example, an Ed25519 public/private key pair. The public key may be published to the blockchain layer 130 in, for example, organization registry 135. The private key, however, may be secured in vault 120b for later retrieval and processing.

Furthermore, in some embodiments, in order to facilitate the publication of a secret key that may be decrypted by a receiving party without sharing any private keys, the Ed25519 public/private key pair may be converted using a cryptographic algorithm. In one instance, the cryptographic algorithm employed may provide for a conversion of the Ed25519 in an X25519 Diffie-Hellman public/private key pair. The public X25519 Diffie-Hellman key may be published, while the private X25519 Diffie-Hellman key may be secured in vault 120b for later retrieval and processing. The published public keys may in turn, in some embodiments, serve as the decentralized identifier (DID) of user 110b. The DID of user 110b may then, in turn, be employed in verifying the user's identity.

iii. An Endpoint Module 125b

A layer 105b may comprise an endpoint module 125b capable of bi-directional data communication in an enterprise systems environment. By way of non-limiting example, one such communication protocol employed by platform 100 may be, for example, the NATs protocol. The associated address (e.g., TCP/IP address of the endpoint may be published to blockchain 130, within, for example, but not limited to, organization registry 135.

Consistent with embodiments of the present disclosure, layer 105b may receive requests to establish a channel of communication with another endpoint (e.g., endpoint 125a associated with layer 105a). As will be detailed below, if such requests meet certain requirements (e.g., an auth token is received within a particular TTL), layer 105a may accept the connection and, in this way, a channel of communication may be established between layer 105a and layer 105b. In turn, the systems of record 115a associated with user 110a and the systems of record 115b associated with user 110b may bi-directionally share data.

III. Platform Operation

Certain aspects of an operation of platform 100 may be illustrated by the following example: Alice wants to establish secure communication with Bob on an ongoing basis (i.e., for business process automation). If Bob and Alice employ platform 100, each party may be provided with, by way of non-limiting example: (i) a vault instance for secure key storage; (ii) access to an organization registry on a public blockchain; and (iii) an externally-accessible, discoverable messaging endpoint (i.e., NATS or other enterprise messaging infrastructure). As will be detailed below, this messaging endpoint is secured against unauthorized access.

It should be understood that, although reference is made to Alice and Bob, and the various actions they may undertake throughout the various embodiments, the underlying actions are performed by the computing elements of platform 100, and not by the users themselves.

Embodiments of the present disclosure provide a hardware and software platform operative by a set of methods and computer-readable media comprising instructions configured to operate the aforementioned modules and computing elements in accordance with the methods. The following depicts an example of at least one method of a plurality of methods that may be performed by at least one of the aforementioned modules. Various hardware components may be used at the various stages of operations disclosed with reference to each module.

For example, although methods may be described to be performed by a single computing device, it should be understood that, in some embodiments, different operations may be performed by different networked elements (e.g., blockchain layer 130) in operative communication with the computing device. For example, at least one computing device 300 associated with layer 105a may be employed in the performance of some the stages disclosed with regard to the methods, while at least one computing device 300 associated with layer 105b may be employed in the performance of other stages disclosed with regard to the methods. Further still, blockchain layer 130 may be employed in some or all of the stages disclosed with regard to the methods.

Moreover, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

A. Starting Conditions

Figure 2A:
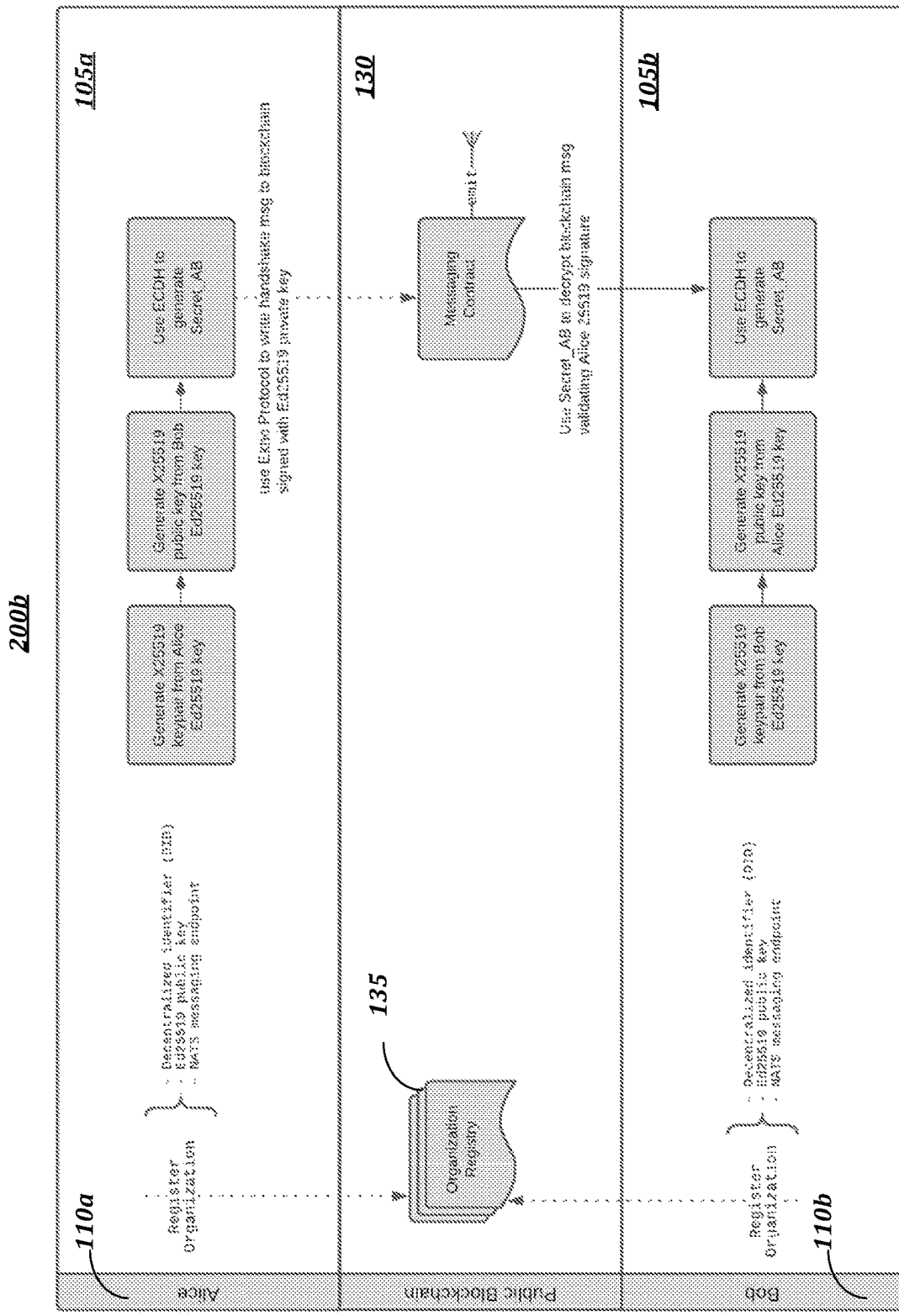
FIG. 2a illustrates a layer and flow diagram of an operating environment consistent with the present disclosure.
Figure 2B:
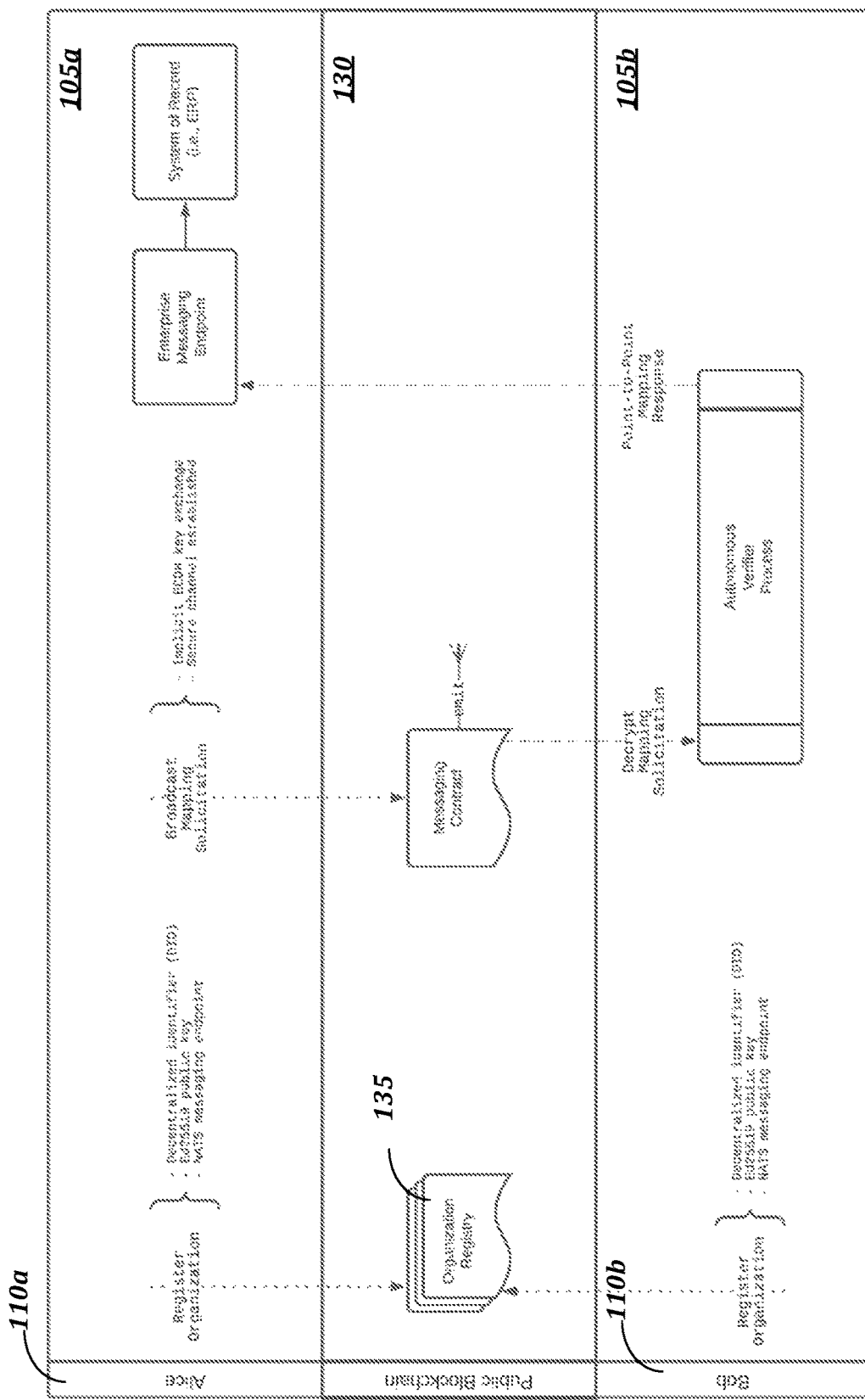
FIG. 2b illustrates another layer and flow diagram of an operating environment consistent with the present disclosure.

Referring now to FIG. 2a and FIG. 2b, Alice (e.g., user 110a of layer 105a) and Bob (e.g., user 110b of layer 105b) may begin by registering their organization through blockchain 130 onto organization registry 135. Each may create an Ed25519 organization messaging key and then convert it into an X25519 Diffie-Hellman key (both public and private parts). Alice and Bob secure both private keys (Ed25519 and X25519) in their corresponding vaults (e.g., vaults 120a and 120b), and share their public Ed25519 key to through blockchain 130 onto organization registry 135. The publicly shared Ed25519 may then, in turn, serve as their DID.

In some embodiments, Alice and Bob may employ platform 100 to facilitate the aforementioned 'on-board' processing, while in other embodiments, the process may be performed through a direct communication with organization registry 135 and/or various other smart contracts 140A-C.

In this way, Alice and Bob become organizations which are registered in such a tamper-resistant, blockchain-based organization registry 135. Such an instance may be, by way of illustrative example, an instance of the Baseline protocol OrgRegistry smart contract on the public Ethereum blockchain. Specifically, in the present example, both Alice and Bob have set a 32-byte public Ed25519 key in the messaging key bytes entry. In some embodiments, the entry may be overloaded on top of another key plus some bytes to identify it as a Ed25519 signing key. As will be detailed below, this Ed25519 public signing key in the organization registry may be used to share a secret and establish a line of communication between both parties.

B. Broadcasting and Listening for the Secret

Referring still to FIG. 2a and FIG. 2b, Alice wants to establish a mapping of Bob's public identifier as it exists in the on-chain organization registry with the private identifier (e.g., GUID or similar) as it exists in Alice's system of record 120a (i.e., SAP, Microsoft Dynamics, and the like). First, Alice may use Bob's Ed25519 public key stored within the public organization registry 135 and convert it to a public X25519 key. In other embodiments, the public X25519 key may already be stored in registry 135. Next, Alice uses her private X25519 key, as derived from her registered public Ed25519 key, and performs an Elliptic Curve Diffie-Hellman (ECDH) to create a secret.

Consistent with embodiments of the present disclosure, Alice may use this secret to establish a private communication channel with Bob on the public blockchain. For instance, Alice can post messages to the public blockchain 130 which can be seen by the entire network. However, only Bob would know to use Alice's public key an ECDH conversion in association with his private X25519 key to decrypted the secret. It should be understood that other cryptographic algorithms may be employed.

With Bob listening for the appropriately encrypted message, this pattern allows Bob to determine that Alice is communicating with him and soliciting verification of certain material facts about Bob such that an autonomous mapping of Bob's identity can be completed within Alice's system of record. The size of the encrypted payload (e.g., a nonce) may be fixed. For example, the encrypted payload of the message may comprise a 32-byte nonce, although other sizes are feasible. In various embodiments, this nonce may, in turn, comprise a limited ttl auth token (e.g., the signed bearer authorization token).

It could be anticipated that Bob is listening for Alice's message, and it would make sense if Alice is someone with whom he wants to communicate. Thus, it could be further anticipated that Bob has already performed the aforementioned steps above to calculate his ECDH shared secret with Alice and set up the channel listener on at the user layer 105b.

Accordingly, once Bob sees the communication from Alice, Bob may decrypt and validate the message (so he knows it's signed with Alice's Ed25519 key per the decentralized organization registry). In this way, Bob may retrieve the payload employing the methods and systems of platform 100. Consistent with embodiments of the present disclosure, Alice's message could be published as a solo, on-chain message, or could be part of a batched set of on-chain messages broadcast by Alice.

C. Payload

Embodiments of the present disclosure may provide a payload comprising bytes for an identifier and padding to ensure all on-chain messages are a consistent size to avoid data leakage. The entirety of this payload may be signed by the sending party. Then, the payload validity can be verified by the recipient. In some embodiments, the payload may be a single-use payload comprising the following elements:

Byte 1: communication identifier or opcode (e.g., 01 for handshake request),

Bytes 2-9: token TTL in seconds, (token ttl should be expressed as a unix epoch timestamp (i.e., seconds since Jan. 1, 1970) instead of a relative number of seconds), Bytes 10-73: reserved area for application-specific fields, and Bytes 74+: signed bearer authorization token.

Anticipating Alice's message for the purposes of ID verification, Bob may know the single-use payload is to: (i) establish a point-to-point connection with Alice, and (ii) provide proof of identity attestation such that Alice can verify Bob's identity and map his public identifier within an identifier for Bob used by Alice's internal systems of record 115a. Once completed, this mapping will enable Alice and Bob to participate in trust-minimized business process automation use-cases.

In various embodiments, Alice's endpoint 125a is not kept secret, as it may not accept all connections. Rather, Alice's endpoint 125a may only accept connections with the appropriate payload (valid, non-expired payload which Alice has signed with her private key). They also have a shared secret, and, as necessary, a ratcheted message key that they could use to encrypt their communications providing message payloads forward secrecy. Accordingly, Bob may be enabled to connect to Alice's messaging endpoint 125a by presenting the signed, short-lived bearer authorization token as provided in the single-use payload, and signing it with his registered Ed25519 key.

Alice can reject all connection attempts that don't include a valid, non-expired bearer authorization token signed by her own private key. Alice's messaging endpoint uses her own public key to verify that she in fact signed the bearer authorization token. It is the bearer authorization token that one counterparty signs and then broadcasts encrypted via the blockchain. The party that is able to decrypt the payload that goes on the blockchain can extract the bearer token and use it to connect to the messaging endpoint to begin identity verification. Accordingly, in various embodiments, ownership of the access token isn't enough to verify and complete the mapping (i.e., there's a built-in element of DDOS protection). Having the right signature and token, and acting within the period of time prescribed by the TTL, Bob's signature is validated and he has successfully established a point-to-point connection with Alice.

D. Identify Verification

Having established an end-to-end connection, the parties may begin to request information for identity verification purposes. The communication may be bi-directional, and, in accordance to various embodiments, any party may initiate the data sharing and both parties may verify each other's identity in this process. In some embodiments, Alice may begin by sending an initial request for information to Bob via the established channel of communication. In other embodiments, Alice may send the initial request to Bob via the public blockchain.

By way of non-limiting example, the request may comprise a request for specific data fields Alice and Bob may be privy to, which may then be used to verify each other's identity. The data requested may be dependent on Alice's needs for her use case, and may be encrypted. The following represents one possible embodiment of the request to autonomously establish a mapping with Bob in the context of Alice's ERP system of record:

```
{
  "handshakeRequest":{
    "request":{
      "validation_hash": "base64-encoded merkle root of expected valid information",
      "algorithm": "sha1|sha256|etc",
      "signature": "signature of validation_hash",
      "key": "Ed25519 signing key used for signature"
    },
    "response":{
      "fields":[
        {
          "response_hash": "hash of provided data - to be filled by Bob",
          "request":"registered address?"
        },
```

```
      {
        "response_hash": "hash of provided data - to be filled by Bob",
        "request": "company registration number?"
      },
      {
        "response_hash": "hash of provided data - to be filled by Bob",
        "request": "last 3 invoice amounts (USD12345.67,USD89012.34,USD56789.01)?"
      }
    ],
    "response_hash": "algorithm merkle root hash of response hashes",
    "signature": "signature of responseHash with Ed25519 signing key",
    "key": "ed15519 signing key used for signature"
    }
  }
}
```

Bob may generate a hashed response to one or more of the datapoints requested by Alice in her solicited challenge. Bob may then send his completed response to Alice in a message using the point-to-point messaging connection. If Bob provides enough information for Alice to make a determination that Bob is who he says he is, based on evaluating each of Bob's responses using context triggered piecewise hashes, the mapping may be completed autonomously.

In accordance with the embodiments of the present disclosure, Bob's hashing of the responses means that Bob provides no direct information to Alice, but Alice can compare each hashed response to her hashes of the expected response and make a determination based on the quality of the response data (i.e., how well it matched). This is the part that uses a process called "fuzzy hashing," which is often used in malware sample comparisons, to compare hash similarity and determine how well it matched. SSDEEP is one example software that exists on the market today that can be used to fulfill this requirement. Some fields may be expected to be 100% (i.e., company registration number), but more qualitative fields like address fields might be acceptable using a lower threshold value such as 80 or 90%. Alice may specify her tolerance in user layer 105a.

In this way, the platform may utilize the public blockchain to enable parties who do not yet know or trust each other to establish secure point-to-point connections. The identity verification stage of the process may occur over the point-to-point connection and not the blockchain. Upon successful verification of the questions, the mapping can be successfully completed and the internal ERP identifier can be mapped to the external DID(s).

E. Completing the Mapping

Once Alice is satisfied that Bob has verified his identity, Alice can (i) complete the mapping of identifiers within her system of record 115a, and (ii) send a handshake request to setup a shared secret based on a one-time key. In some embodiments, a final step may comprise a key rotation from the derived X25519 key to a one-time X25519 key established over the trusted and secure connection. It should be understood that, although the aforementioned scenario was presented in the context of Alice validating Bob's identity, either party may employ similar steps to verify the other's identity through the same process.

IV. Computing Device

Platform 100 may be embodied as, for example, but not be limited to, a website, a web application, a desktop application, backend application, and a mobile application compatible with a computing device 300. The computing device 300 may comprise, but not be limited to the following:

Mobile computing device, such as, but is not limited to, a laptop, a tablet, a smartphone, a drone, a wearable, an embedded device, a handheld device, an Arduino, an industrial device, or a remotely operable recording device;

A supercomputer, an exa-scale supercomputer, a mainframe, or a quantum computer;

A minicomputer, wherein the minicomputer computing device comprises, but is not limited to, an IBM AS400/iSeries/System I, A DEC VAX/PDP, a HP3000, a Honeywell-Bull DPS, a Texas Instruments TI-990, or a Wang Laboratories VS Series;

A microcomputer, wherein the microcomputer computing device comprises, but is not limited to, a server, wherein a server may be rack mounted, a workstation, an industrial device, a raspberry pi, a desktop, or an embedded device;

Platform 100 may be hosted on a centralized server or a cloud computing service. Although method $00 has been described to be performed by a computing device 300, it should be understood that, in some embodiments, different operations may be performed by a plurality of the computing devices 300 in operative communication at least one network.

Embodiments of the present disclosure may comprise a system having a central processing unit (CPU) 320, a bus 330, a memory unit 340, a power supply unit (PSU) 350, and one or more Input/Output (I/O) units. The CPU 320 coupled to the memory unit 340 and the plurality of I/O units 360 via the bus 330, all of which are powered by the PSU 350. It should be understood that, in some embodiments, each disclosed unit may actually be a plurality of such units for the purposes of redundancy, high availability, and/or performance. The combination of the presently disclosed units is configured to perform the stages any method disclosed herein.

Figure 3:
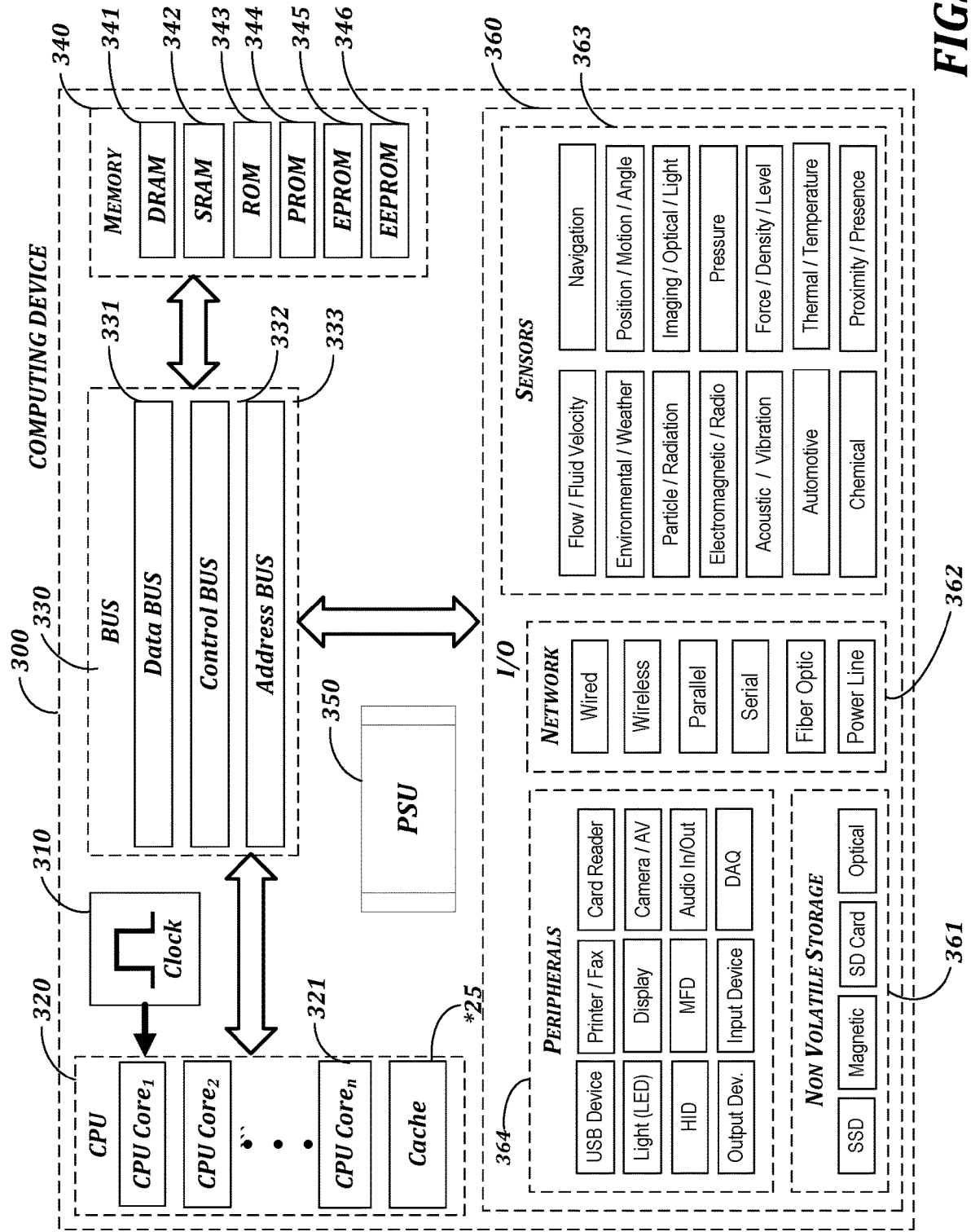
FIG. 3 is a block diagram of a system including a computing device operative with the various embodiments.

FIG. 3 is a block diagram of a system including computing device 300. Consistent with an embodiment of the disclosure, the aforementioned CPU 320, the bus 330, the memory unit 340, a PSU 350, and the plurality of I/O units 360 may be implemented in a computing device, such as computing device 300 of FIG. 3. Any suitable combination of hardware, software, or firmware may be used to implement the aforementioned units. For example, the CPU 320, the bus 330, and the memory unit 340 may be implemented with computing device 300 or any of other computing devices 300, in combination with computing device 300. The aforementioned system, device, and components are examples and other systems, devices, and components may comprise the aforementioned CPU 320, the bus 330, the memory unit 340, consistent with embodiments of the disclosure.

At least one computing device 300 may be embodied as any of the computing elements illustrated in all of the attached figures, including the aforementioned modules. A computing device 300 does not need to be electronic, nor even have a CPU 320, nor bus 330, nor memory unit 340. The definition of the computing device 300 to a person having ordinary skill in the art is "A device that computes, especially a programmable [usually] electronic machine that performs high-speed mathematical or logical operations or that assembles, stores, correlates, or otherwise processes information." Any device which processes information qualifies as a computing device 300, especially if the processing is purposeful.

With reference to FIG. 3, a system consistent with an embodiment of the disclosure may include a computing device, such as computing device 300. In a basic configuration, computing device 300 may include at least one clock module 310, at least one CPU 320, at least one bus 330, and at least one memory unit 340, at least one PSU 350, and at least one I/O 360 module, wherein I/O module may be comprised of, but not limited to a non-volatile storage sub-module 361, a communication sub-module 362, a sensors sub-module 363, and a peripherals sub-module 364.

A system consistent with an embodiment of the disclosure the computing device 300 may include the clock module 310 may be known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 320, the central component of modern computers, which relies on a clock. The only exceptions are asynchronous circuits such as asynchronous CPUs. The clock 310 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 4 wires.

Many computing devices 300 use a "clock multiplier" which multiplies a lower frequency external clock to the appropriate clock rate of the CPU 320. This allows the CPU 320 to operate at a much higher frequency than the rest of the computer, which affords performance gains in situations where the CPU 320 does not need to wait on an external factor (like memory 340 or input/output 360). Some embodiments of the clock 310 may include dynamic frequency change, where the time between clock edges can vary widely from one edge to the next and back again.

A system consistent with an embodiment of the disclosure the computing device 300 may include the CPU unit 320 comprising at least one CPU Core 321. A plurality of CPU cores 321 may comprise identical CPU cores 321, such as, but not limited to, homogeneous multi-core systems. It is also possible for the plurality of CPU cores 321 to comprise different CPU cores 321, such as, but not limited to, heterogeneous multi-core systems, big.LITTLE systems and some AMD accelerated processing units (APU). The CPU unit 320 reads and executes program instructions which may be used across many application domains, for example, but not limited to, general purpose computing, embedded computing, network computing, digital signal processing (DSP), and graphics processing (GPU). The CPU unit 320 may run multiple instructions on separate CPU cores 321 at the same time. The CPU unit 320 may be integrated into at least one of a single integrated circuit die and multiple dies in a single chip package. The single integrated circuit die and multiple dies in a single chip package may contain a plurality of other aspects of the computing device 300, for example, but not limited to, the clock 310, the CPU 320, the bus 330, the memory 340, and I/O 360.

The CPU unit 320 may contain cache 322 such as, but not limited to, a level 1 cache, level 2 cache, level 3 cache or combination thereof. The aforementioned cache 322 may or may not be shared amongst a plurality of CPU cores 321. The cache 322 sharing comprises at least one of message passing and inter-core communication methods may be used for at least one CPU Core 321 to communicate with the cache 322. The inter-core communication methods may comprise, but not limited to, bus, ring, two-dimensional mesh, and crossbar. The aforementioned CPU unit 320 may employ symmetric multiprocessing (SMP) design.

The plurality of the aforementioned CPU cores 321 may comprise soft microprocessor cores on a single field programmable gate array (FPGA), such as semiconductor intellectual property cores (IP Core). The plurality of CPU cores 321 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 321, for example, but not limited to Instruction-level parallelism (ILP) such as, but not limited to, super-scalar pipelining, and Thread-level parallelism (TLP).

Consistent with the embodiments of the present disclosure, the aforementioned computing device 300 may employ a communication system that transfers data between components inside the aforementioned computing device 300, and/or the plurality of computing devices 300. The aforementioned communication system will be known to a person having ordinary skill in the art as a bus 330. The bus 330 may embody internal and/or external plurality of hardware and software components, for example, but not limited to a wire, optical fiber, communication protocols, and any physical arrangement that provides the same logical function as a parallel electrical bus. The bus 330 may comprise at least one of, but not limited to a parallel bus, wherein the parallel bus carry data words in parallel on multiple wires, and a serial bus, wherein the serial bus carry data in bit-serial form. The bus 330 may embody a plurality of topologies, for example, but not limited to, a multidrop/electrical parallel topology, a daisy chain topology, and a connected by switched hubs, such as USB bus. The bus 330 may comprise a plurality of embodiments, for example, but not limited to:

Internal data bus (data bus) 331/Memory bus
Control bus 332
Address bus 333
System Management Bus (SMBus)
Front-Side-Bus (FSB)
External Bus Interface (EBI)
Local bus
Expansion bus
Lightning bus
Controller Area Network (CAN bus)
Camera Link
ExpressCard Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.

Small Computer System Interface (SCSI)/Serial Attached SCSI (SAS)

HyperTransport

InfiniBand

RapidIO

Mobile Industry Processor Interface (MIPI)

Coherent Processor Interface (CAPI)

Plug-n-play

1-Wire

Peripheral Component Interconnect (PCI), including embodiments such as, but not limited to, Accelerated Graphics Port (AGP), Peripheral Component Interconnect eXtended (PCI-X), Peripheral Component Interconnect Express (PCI-e) (e.g., PCI Express Mini Card, PCI Express M.2 [Mini PCIe v2], PCI Express External Cabling [ePCIe], and PCI Express OCuLink [Optical Copper{Cu} Link]), Express Card, AdvancedTCA, AMC, Universal 10, Thunderbolt/Mini DisplayPort, Mobile PCIe (M-PCIe), U.2, and Non-Volatile Memory Express (NVMe)/Non-Volatile Memory Host Controller Interface Specification (NVMHCIS).

Industry Standard Architecture (ISA), including embodiments such as, but not limited to Extended ISA (EISA), PC/XT-bus/PC/AT-bus/PC/104 bus (e.g., PC/104-Plus, PCI/104-Express, PCI/104, and PCI-104), and Low Pin Count (LPC).

Music Instrument Digital Interface (MIDI)

Universal Serial Bus (USB), including embodiments such as, but not limited to, Media Transfer Protocol (MTP)/Mobile High-Definition Link (MHL), Device Firmware Upgrade (DFU), wireless USB, InterChip USB, IEEE 1394 Interface/Firewire, Thunderbolt, and eXtensible Host Controller Interface (xHCI).

Consistent with the embodiments of the present disclosure, the aforementioned computing device 300 may employ hardware integrated circuits that store information for immediate use in the computing device 300, know to the person having ordinary skill in the art as primary storage or memory 340. The memory 340 operates at high speed, distinguishing it from the non-volatile storage sub-module 361, which may be referred to as secondary or tertiary storage, which provides slow-to-access information but offers higher capacities at lower cost. The contents contained in memory 340, may be transferred to secondary storage via techniques such as, but not limited to, virtual memory and swap. The memory 340 may be associated with addressable semiconductor memory, such as integrated circuits consisting of silicon-based transistors, used for example as primary storage but also other purposes in the computing device 300. The memory 340 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

Volatile memory which requires power to maintain stored information, for example, but not limited to, Dynamic Random-Access Memory (DRAM) 341, Static Random-Access Memory (SRAM) 342, CPU Cache memory 325, Advanced Random-Access Memory (A-RAM), and other types of primary storage such as Random-Access Memory (RAM).

Non-volatile memory which can retain stored information even after power is removed, for example, but not limited to, Read-Only Memory (ROM) 343, Programmable ROM (PROM) 344, Erasable PROM (EPROM) 345, Electrically Erasable PROM (EEPROM) 346 (e.g., flash memory and Electrically Alterable PROM [EAPROM]), Mask ROM (MROM), One Time Programmable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.

Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).

Consistent with the embodiments of the present disclosure, the aforementioned computing device 300 may employ the communication system between an information processing system, such as the computing device 300, and the outside world, for example, but not limited to, human, environment, and another computing device 300. The aforementioned communication system will be known to a person having ordinary skill in the art as I/O 360. The I/O module 360 regulates a plurality of inputs and outputs with regard to the computing device 300, wherein the inputs are a plurality of signals and data received by the computing device 300, and the outputs are the plurality of signals and data sent from the computing device 300. The I/O module 360 interfaces a plurality of hardware, such as, but not limited to, non-volatile storage 361, communication devices 362, sensors 363, and peripherals 364. The plurality of hardware is used by the at least one of, but not limited to, human, environment, and another computing device 300 to communicate with the present computing device 300. The I/O module 360 may comprise a plurality of forms, for example, but not limited to channel I/O, port mapped I/O, asynchronous I/O, and Direct Memory Access (DMA).

Consistent with the embodiments of the present disclosure, the aforementioned computing device 300 may employ the non-volatile storage sub-module 361, which may be referred to by a person having ordinary skill in the art as one of secondary storage, external memory, tertiary storage, off-line storage, and auxiliary storage. The non-volatile storage sub-module 361 may not be accessed directly by the CPU 320 without using intermediate area in the memory 340. The non-volatile storage sub-module 361 does not lose data when power is removed and may be two orders of magnitude less costly than storage used in memory module, at the expense of speed and latency. The non-volatile storage sub-module 361 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (361) may comprise a plurality of embodiments, such as, but not limited to:

Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD±RW/DVD+R DL/DVD-RAM/HD-DVD), Blu-ray Disk (BD) (BD-ROM/BD-R/BD-RE/BD-R DL/BD-RE DL), and Ultra-Density Optical (UDO).

Semiconductor storage, for example, but not limited to, flash memory, such as, but not limited to, USB flash drive, Memory card, Subscriber Identity Module (SIM) card, Secure Digital (SD) card, Smart Card, CompactFlash (CF) card, Solid-State Drive (SSD) and memristor.

Magnetic storage such as, but not limited to, Hard Disk Drive (HDD), tape drive, carousel memory, and Card Random-Access Memory (CRAM).

Phase-change memory

Holographic data storage such as Holographic Versatile Disk (HVD).

Molecular Memory

Deoxyribonucleic Acid (DNA) digital data storage

Consistent with the embodiments of the present disclosure, the aforementioned computing device 300 may employ the communication sub-module 362 as a subset of the I/O 360, which may be referred to by a person having ordinary skill in the art as at least one of, but not limited to, computer network, data network, and network. The network allows computing devices 300 to exchange data using connections, which may be known to a person having ordinary skill in the art as data links, between network nodes. The nodes comprise network computer devices 300 that originate, route, and terminate data. The nodes are identified by network addresses and can include a plurality of hosts consistent with the embodiments of a computing device 300. The aforementioned embodiments include, but not limited to personal computers, phones, servers, drones, and networking devices such as, but not limited to, hubs, switches, routers, modems, and firewalls.

Two nodes can be said to be networked together, when one computing device 300 is able to exchange information with the other computing device 300, whether or not they have a direct connection with each other. The communication sub-module 362 supports a plurality of applications and services, such as, but not limited to World Wide Web (WWW), digital video and audio, shared use of application and storage computing devices 300, printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g., TCP/IP, UDP, Internet Protocol version 4 [IPv4], and Internet Protocol version 6 [IPv6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], and Integrated Digital Enhanced Network [IDEN]).

The communication sub-module 362 may comprise a plurality of size, topology, traffic control mechanism and organizational intent. The communication sub-module 362 may comprise a plurality of embodiments, such as, but not limited to:

Wired communications, such as, but not limited to, coaxial cable, phone lines, twisted pair cables (ethernet), and InfiniBand.

Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Wherein cellular systems embody technologies such as, but not limited to, 3G, 4G (such as WiMax and LTE), and 5G (short and long wavelength).

Parallel communications, such as, but not limited to, LPT ports.

Serial communications, such as, but not limited to, RS-232 and USB.

Fiber Optic communications, such as, but not limited to, Single-mode optical fiber (SMF) and Multi-mode optical fiber (MMF).

Power Line communications

The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 300 may employ the sensors sub-module 363 as a subset of the I/O 360. The sensors sub-module 363 comprises at least one of the devices, modules, and subsystems whose purpose is to detect events or changes in its environment and send the information to the computing device 300. Sensors are sensitive to the measured property, are not sensitive to any property not measured, but may be encountered in its application, and do not significantly influence the measured property. The sensors sub-module 363 may comprise a plurality of digital devices and analog devices, wherein if an analog device is used, an Analog to Digital (A-to-D) converter must be employed to interface the said device with the computing device 300. The sensors may be subject to a plurality of deviations that limit sensor accuracy. The sensors sub-module 363 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:

Chemical sensors, such as, but not limited to, breathalyzer, carbon dioxide sensor, carbon monoxide/smoke detector, catalytic bead sensor, chemical field-effect transistor, chemiresistor, electrochemical gas sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nanosensors).

Automotive sensors, such as, but not limited to, air flow meter/mass airflow sensor, air-fuel ratio meter, AFR sensor, blind spot monitor, engine coolant/exhaust gas/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (o2), parking sensor, radar sensor, torque sensor, variable reluctance sensor, and water-in-fuel sensor.

Acoustic, sound and vibration sensors, such as, but not limited to, microphone, lace sensor (guitar pickup), seismometer, sound locator, geophone, and hydrophone.

Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.

Environmental, weather, moisture, and humidity sensors, such as, but not limited to, actinometer, air pollution sensor, bedwetting alarm, ceilometer, dew warning, electrochemical gas sensor, fish counter, frequency domain sensor, gas detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.

Flow and fluid velocity sensors, such as, but not limited to, air flow meter, anemometer, flow sensor, gas meter, mass flow sensor, and water meter.

Ionizing radiation and particle sensors, such as, but not limited to, cloud chamber, Geiger counter, Geiger-Muller tube, ionization chamber, neutron detection, proportional counter, scintillation counter, semiconductor detector, and thermoluminescent dosimeter.

Navigation sensors, such as, but not limited to, air speed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

Position, angle, displacement, distance, speed, and acceleration sensors, such as, but not limited to, accelerometer, displacement sensor, flex sensor, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.

Imaging, optical and light sensors, such as, but not limited to, CMOS sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photoswitch, phototube, scintillometer, Shack-Hartmann, single-photon avalanche diode, superconducting nanowire single-photon detector, transition edge sensor, visible light photon counter, and wavefront sensor.

Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors, such as, but not limited to, bhangmeter, hydrometer, force gauge or force sensor, level sensor, load cell, magnetic level or nuclear density sensor or strain gauge, piezocapacitive pressure sensor, piezoelectric sensor, torque sensor, and viscometer.

Thermal and temperature sensors, such as, but not limited to, bolometer, bimetallic strip, calorimeter, exhaust gas temperature gauge, flame detection/pyrometer, Gardon gauge, Golay cell, heat flux sensor, microbolometer, microwave radiometer, net radiometer, infrared/quartz/resistance thermometer, silicon bandgap temperature sensor, thermistor, and thermocouple.

Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 300 may employ the peripherals sub-module 362 as a subset of the I/O 360. The peripheral sub-module 364 comprises ancillary devices uses to put information into and get information out of the computing device 300. There are 3 categories of devices comprising the peripheral sub-module 364, which exist based on their relationship with the computing device 300, input devices, output devices, and input/output devices. Input devices send at least one of data and instructions to the computing device 300. Input devices can be categorized based on, but not limited to:

Modality of input, such as, but not limited to, mechanical motion, audio, visual, and tactile.

Whether the input is discrete, such as but not limited to, pressing a key, or continuous such as, but not limited to position of a mouse.

The number of degrees of freedom involved, such as, but not limited to, two-dimensional mice vs three-dimensional mice used for Computer-Aided Design (CAD) applications.

Output devices provide output from the computing device 300. Output devices convert electronically generated information into a form that can be presented to humans. Input/output devices perform both input and output functions. It should be understood by a person having ordinary skill in the art that the ensuing are non-limiting embodiments of the aforementioned peripheral sub-module 364:

Input Devices
- Human Interface Devices (HID), such as, but not limited to, pointing device (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).
- High degree of freedom devices, that require up to six degrees of freedom such as, but not limited to, camera gimbals, Cave Automatic Virtual Environment (CAVE), and virtual reality systems.
- Video Input devices are used to digitize images or video from the outside world into the computing device 300. The information can be stored in a multitude of formats depending on the user's requirement. Examples of types of video input devices include, but not limited to, digital camera, digital camcorder, portable media player, webcam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.
- Audio input devices are used to capture sound. In some cases, an audio output device can be used as an input device, in order to capture produced sound. Audio input devices allow a user to send audio signals to the computing device 300 for at least one of processing, recording, and carrying out commands. Devices such as microphones allow users to speak to the computer in order to record a voice message or navigate software. Aside from recording, audio input devices are also used with speech recognition software. Examples of types of audio input devices include, but not limited to, microphone, Musical Instrument Digital Interface (MIDI) devices such as, but not limited to a keyboard, and headset.
- Data AcQuisition (DAQ) devices convert at least one of analog signals and physical parameters to digital values for processing by the computing device 300. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:
- Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).
- Printers, such as, but not limited to, inkjet printers, laser printers, 3D printers, solid ink printers and plotters.
- Audio and Video (AV) devices, such as, but not limited to, speakers, headphones, amplifiers and lights, which include lamps, strobes, DJ lighting, stage lighting, architectural lighting, special effect lighting, and lasers.
- Other devices such as Digital to Analog Converter (DAC)

Input/Output Devices may further comprise, but not be limited to, touchscreens, networking device (e.g., devices disclosed in network 362 sub-module), data storage device (non-volatile storage 361), facsimile (FAX), and graphics/sound cards.

All rights including copyrights in the code included herein are vested in and the property of the Applicant. The Applicant retains and reserves all rights in the code included herein, and grants permission to reproduce the material only in connection with reproduction of the granted patent and for no other purpose.

V. Aspects

The following disclose various Aspects of the present disclosure. The various Aspects are not to be construed as patent claims unless the language of the Aspect appears as a patent claim. The Aspects describe various non-limiting embodiments of the present disclosure.

A first aspect comprising computer-readable set of instructions, which when executed by one or more computing devices, operate the one or more computing devices to perform the following stages:
a. maintaining a distributed ledger on the decentralized platform; and
b. posting one or more smart contracts to the distributed ledger,
c. wherein the one or more smart contract are configured to:
  i. publish a first public key associated with the first party (Ed25519 Public Key);
  ii. publish a second public key associated with the second party (Ed25519 Public Key);
  iii. publish a first endpoint address associated with the first party (NATS);
  iv. publish a second endpoint address associated with the second party (NATS);
  v. receiving a message for publication to the distributed ledger; and
  vi. publishing the message to the distributed ledger.

A second aspect comprising computer-readable set of instructions, which when executed by one or more computing devices, operate the one or more computing devices to perform the following stages:
a. retrieving the second public key associated with the second party;
b. generating a secret based on, at least in part, the second public key associated with the second party and a private key of the first party (i.e., ECDH, used to prevent MITM attacks typically associated with ECDH since the public blockchain is used to facilitate);
c. generating a payload configured to be used for establishing a direct channel of communication between the first party and the second party for the purposes of validating each party's identify,
  i. wherein the payload comprises at least one of the following:
    1. a limited TTL auth token (signed by First Party),
    2. wherein the auth token is packaged as an encrypted, forward-secret payload, d. encrypting the payload using the secret; and
e. broadcasting a message containing the payload, wherein broadcasting the message comprises:
   i. submitting the message comprising the payload for publication to the distributed ledger.

A third aspect comprising computer-readable set of instructions, which when executed by one or more computing devices, operate the one or more computing devices to perform the following stages:
   a. scanning the distributed ledger for a message that can be decrypted using, at least in part, the first public key;
   b. identifying a message that can be decrypted using, at least in part, the first public key and the private key associated with the second party,
   c. decrypting the message to obtain the payload,
      i. wherein decrypting comprises extracting the payload, and
      ii. wherein extracting the payload comprises obtaining the auth token with the limited TTL period;
   d. retrieving the first endpoint address associated with the first party;
   e. requesting to establish the direct channel of communication at the first endpoint associated with the first party,
      i. wherein the request comprises receiving the auth token, and
      ii. wherein requesting comprises requesting within the TTL period;
   f. establishing the connection when the first party accepts the request;
   g. exchanging, via the direct channel of communication between the first party and the second party, data used to validate the identify of each party; and
   h. validating the identity of the first party based on the data; and
   i. mapping an internal identifier with a DID.

A fourth aspect comprising computer-readable set of instructions, which when executed by one or more computing devices, operate the one or more computing devices to perform the following stages:
   a. receiving, from the second party, a request to establish the direct channel of communication at the first endpoint associated with the first party;
      i. wherein receiving the request comprises receiving the auth token,
      ii. wherein receiving the request comprises receiving signed request by the second party's public signing key,
      iii. wherein receiving the request comprises receiving the request within the TTL period,
   b. accepting the connection when the request comprises the auth token with the TTL period;
   c. exchanging, via the direct channel of communication between the first party and the second party, data used to validate the identify of each party,
      i. wherein the data comprises hashes associated with underlying data;
   d, validating the identity of the second party based on the data; and
   e. mapping, upon validation, the private identifier of the first party with the public identifier of the second party.

VI. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The invention claimed is:

1. A method comprising:
   establishing off-chain a decentralized identifier (DID) associated with a first organization and a second organization registered on a public blockchain;
   encrypting, by the first organization, a mapping solicitation message comprising an authentication token with a limited time to live (TTL);
   broadcasting, to the public blockchain, the mapping solicitation message;
   decrypting the mapping solicitation message by a second organization registered on the public blockchain:
   deriving the authentication token from the decrypted mapping solicitation message;
   validating the authentication token within the TTL by an autonomous blockchain verification process;
   responsive to the validation, establishing a private channel of communication on the public blockchain between the second organization and a message end point associated with the first organization;
   mapping an internal identifier associated with a system of record connected to the message end point of the first organization to the DID over the private channel, wherein the mapping of the internal identifier comprises a conversion associated with a public key of the first organization and a private key of the second organization.

2. The method of claim 1, further comprising:
   executing a smart contract to broadcast the mapping solicitation message over the public blockchain.

3. The method of claim 1, further comprising:
   listening for a broadcast of the mapping solicitation message comprising an encrypted payload;
   retrieving the mapping solicitation message containing the encrypted payload;
   decrypting the payload using, at least in part, a secret key of the second organization;
   determining an endpoint address for establishing the private channel of communication with the authentication token within the TTL; and
   presenting the authentication token for establishing the private channel of communication at the endpoint address within the TTL.

4. The method of claim 3, wherein determining the endpoint address for establishing the private channel of communication with the authentication token within the TTL comprises:
   performing a lookup, in a decentralized registry, of the endpoint address for establishing the private channel of communication; and
   retrieving, from the decentralized registry, the endpoint address for establishing the private channel of communication with the authentication token within the TTL.

5. The method of claim 4, wherein determining the endpoint address for establishing the private channel of communication with the authentication token within the TTL comprises extracting the payload to retrieve the endpoint address.

6. The method of claim 1, further comprising:
maintaining a decentralized registry on the public blockchain; and
executing one or more smart contracts on the public blockchain to:
publish a public key associated with the first organization;
publish a public key associated with the second organization;
publish a first endpoint address associated with the first organization; and
publish a second endpoint address associated with the second organization.

7. The method of claim 6, further comprising:
performing a lookup of a second organization's decentralized identifier in the decentralized registry; and
associating the second organization with the decentralized identifier.

8. The method of claim 1, further comprising:
communicating a message comprising a methodology to derive a secret key;
listening for a message containing a confirmation of receipt of the methodology for deriving the secret key;
receiving the message containing the confirmation of receipt; and
initiating a process to broadcast the encrypted mapping solicitation message.

9. The method of claim 3, further comprising:
listening for a message containing a methodology for deriving the secret key;
retrieving the message containing the methodology for deriving the secret key; and
communicating a confirmation message.

10. A method comprising:
retrieving a target public key associated with a target party, wherein retrieving the target public key comprises utilizing a decentralized identifier associated with the target party and a requesting party;
generating a secret off-chain based on, at least in part, the target public key associated with the target party and a private key associated with the requesting party;
generating a payload off-chain configured to be used for establishing a direct private channel of communication between the requesting party and the target party for validating each party's identity, wherein the payload comprises an authentication token with a limited time to live (TTL);
encrypting the payload off-chain using the secret;
broadcasting a message comprising the payload to a public blockchain;
determining whether an intended recipient, as represented by an internal identifier within the requesting party's system of record, will be able to provide the authentication token to the requesting party in order to establish that the intended recipient is the target party represented by the decentralized identifier used to retrieve the target party's public key; and
mapping the internal identifier associated with the system of record connected to the requesting party to the decentralized identifier over the direct private channel of communication, wherein the mapping of the internal identifier comprises a conversion associated with a public key of the requesting party and a private key of the target party.

11. The method of claim 10, further comprising:
scanning the public blockchain for any message that can be decrypted using, at least in part, the requesting party's public key;
identifying a message that can be decrypted using, at least in part, the requesting party's public key and a private key associated with the target party;
decrypting the message to obtain the payload to extract the payload to obtain the authentication token with the limited TTL period; and
requesting to establish the direct private channel of communication at an endpoint associated with the requesting party,
wherein a request comprises receiving the authentication token within the TTL period.

12. The method of claim 11, further comprising:
establishing a connection when the requesting party accepts the direct private channel of communication request; and
exchanging, via the direct private channel of communication between the requesting party and the target party, data used to validate the identity of each party.

13. The method of claim 12, further comprising:
validating the identity of the requesting party based on the data; and
mapping an internal identifier to the decentralized identifier.

14. The method of claim 10, further comprising:
receiving, from the target party, a request to establish the direct private channel of communication at an endpoint address associated with the requesting party, wherein receiving the request comprises receiving the authentication token with the request; and
accepting a connection if, at least in part, the request comprises the authentication token within the TTL period.

15. The method of claim 14, further comprising:
exchanging, via the direct private channel of communication between the requesting party and the target party, data used to validate the identity of at least one party;
validating the identity of the at least one party based on the data; and
mapping, upon validation, a private identifier of the first party with a public identifier of the target party.

16. The method of claim 14, wherein receiving the request comprises receiving a request signed by the target party's public key.

17. The method of claim 14, wherein receiving the request comprises receiving the request within the limited TTL period.

18. The method of claim 15, wherein the data comprises hashes associated with underlying data corresponding to at least one internal record.

19. The method of claim 10, wherein the authentication token is packaged in the payload.

20. The method of claim 10, further comprising:
maintaining an organizational registry on the public blockchain; and
executing one or more smart contracts on the public blockchain to:
publish the public key associated with the requesting party;
publish the public key associated with the target party;
publish a first endpoint address associated with the requesting party; and publish a second endpoint address associated with the target party.

\* \* \* \* \*